Patented May 7, 1946

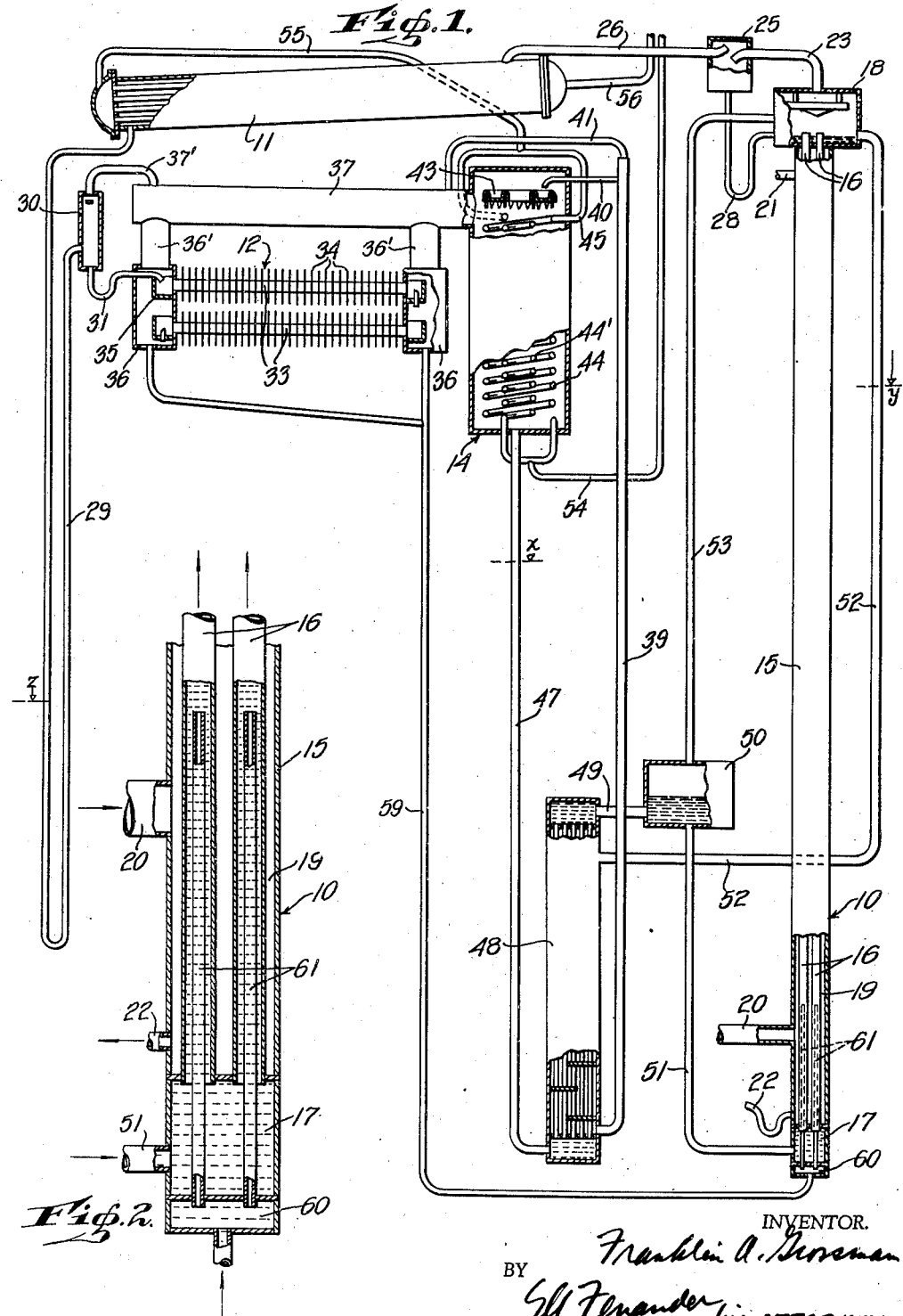

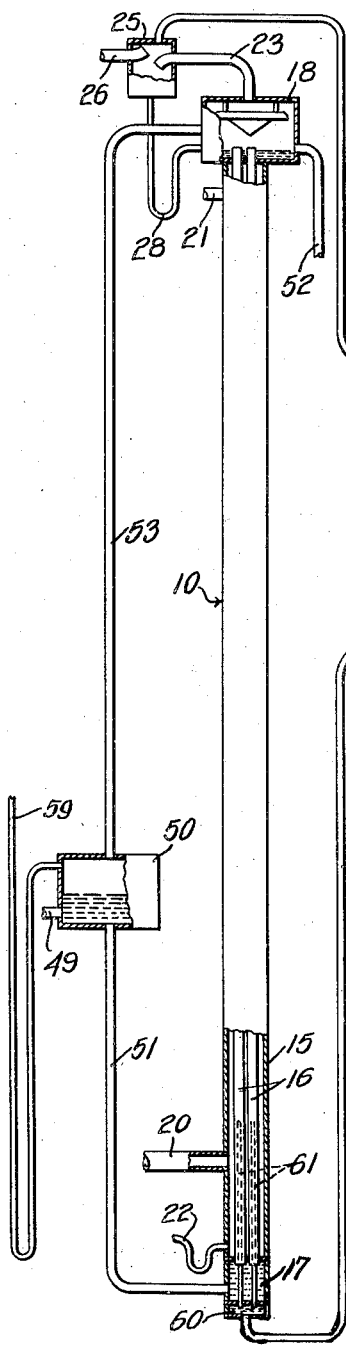
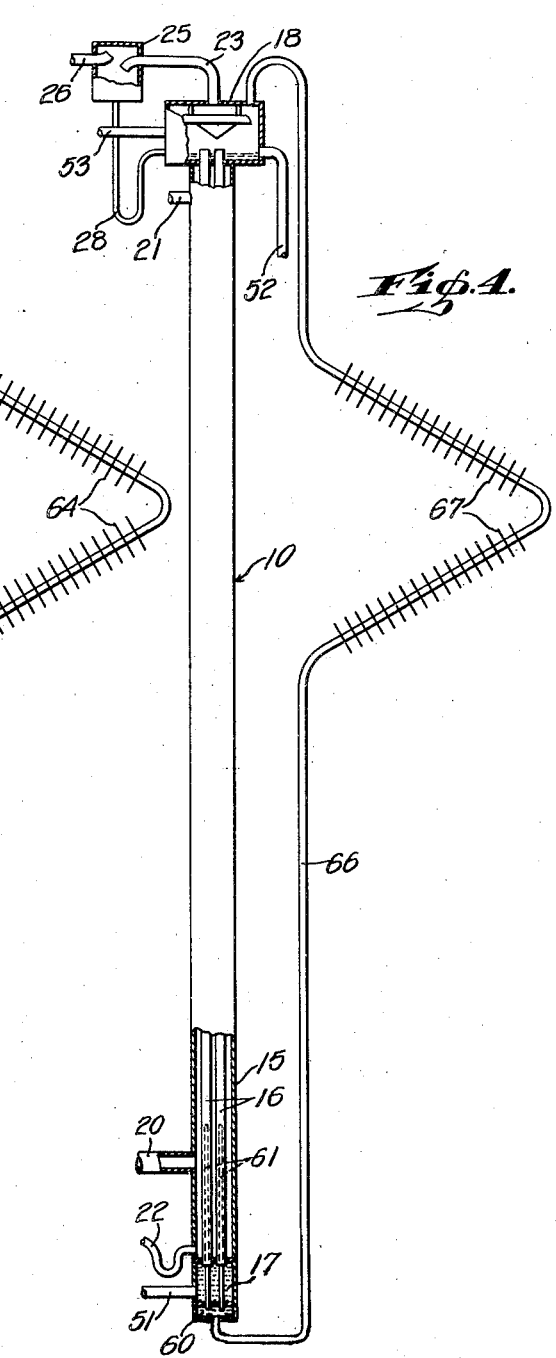

2,399,922

UNITED STATES PATENT OFFICE 2,399,922

REFRIGERATION

Franklin A. Grossman, Evansville, Ind., assignor to Servel, Inc., New York, N. Y., a corporation of Delaware Application March 3, 1943, Serial No. 477,804

13 Claims. (Cl. 62—119)

My invention relates to refrigeration, and more particularly to refrigeration systems of the absorption type.

In refrigeration systems of this type absorption solution enriched in refrigerant flows from an absorber to a generator and refrigerant vapor is expelled out of the solution in the generator by heat. The expelled refrigerant vapor is often utilized to raise or lift absorption liquid to a higher level by gas or vapor-lift action. A generator in which liquid is raised by vapor-lift action may include one or more heated riser tubes in which absorption liquid is carried up as an annulus with the expelled refrigerant vapor forming a central core. The expelled refrigerant vapor rises more rapidly than the absorption liquid, the liquid following the vapor along the inside walls of the tubes.

In generators of this type superheating may occur to disturb the normal steady lifting of the absorption solution. This is a condition that exists due to absence of fluid in vapor phase even after the boiling temperature is reached. When the solution does become sufficiently heated to produce vapor, all of the solution standing in the generator tubes may be carried upward at one time due to vapor flashing and in this way momentarily clear the tubes of liquid. Thereafter there is a tendency for the absorption solution in the generator to begin superheating again and the same action is repeated.

Objectionable condensate knocking also may result in generators of the type referred to above because of the collapse of small vapor bubbles soon after they are formed in the tubes. For example, when the liquid in the lower parts of the riser tubes reaches a boiling temperature, small vapor bubbles form in the regions which are in intimate contact with the tube walls. As the vapor bubbles increase in size they break away from the tube walls and pass into cooler regions of liquid in the center portions of the tubes where they often collapse suddenly. This is due to the fact that with a parallel or more or less straight line flow of the liquid in the tubes, heating of the core or center regions of the liquid is effected only by conduction. Hence, there is a temperature gradient in the rising body of liquid in a tube with the highest temperature at the tube walls and the lowest temperature in the center region of the tubes.

It is an object of my invention to provide an improvement whereby condensate knocking and superheating are avoided in a generator or vapor expeller of an absorption refrigeration system. I accomplish this by using as an ebullition promotor either liquid refrigerant or a solution containing a greater proportion of refrigerant than the absorption solution in the generator. The refrigerant is vaporized and its vapor is introduced into the system at the region where expulsion of refrigerant vapor is effected. The vapor discharged into the solution in this manner provides a nucleus for the formation of refrigerant vapor in the solution, thereby avoiding the occurrence of superheating and condensate knocking.

The invention, together with the above and other objects and advantages thereof, will be better understood from the following description taken in conjunction with the accompanying drawings forming a part of this specification, and in which:

Fig. 1 is a view more or less diagrammatically illustrating a refrigeration system embodying the invention;

Fig. 2 is an enlarged sectional view of the lower part of the generator shown in Fig. 1; and Figs. 3 and 4 are fragmentary views of the refrigeration system shown in Fig. 1 illustrating two additional embodiments of the invention.

Referring to Fig. 1, the invention is embodied in a two-pressure absorption refrigeration system similar to that described in United States Letters Patent No. 2,282,503 of A. R. Thomas and P. P. Anderson, Jr., granted May 12, 1942. A system of this type operates at low pressures and includes a generator or vapor expeller 10, a condenser 11, an evaporator 12, and an absorber 14 which are interconnected in such a manner that the pressure differential in the system is maintained by liquid columns.

The generator 10 includes an outer shell 15 within which are disposed a plurality of vertical riser tubes 16 having the lower ends thereof communicating with a space 17 just above the bottom of shell 15, and the upper ends thereof extending into and above the bottom of a vessel 18. The space 19 within shell 15 forms a steam chamber about the tubes 16 to which steam is supplied through a conduit 20 from a suitable source of supply. The space 19 provides for full length heating of tubes 16 with a vent 21 located at the upper end of shell 15. A conduit 22 is connected to the lower part of shell 15 for draining condensate from space 19.

The system operates at a partial vacuum and contains a water solution of refrigerant in absorbent liquid, such as, for example, a water solution of lithium chloride containing about 40% lithium chloride by weight. With steam being supplied through conduit 20 to space 19, heat is applied to tubes 16 whereby refrigerant vapor is expelled from the solution. The absorption solution is raised by gas or vapor-lift action with the expelled refrigerant vapor forming a central core within an upwardly rising annulus of the liquid. The expelled refrigerant or water vapor rises more rapidly than the absorption liquid with the liquid following the vapor along the inside walls of tubes 16.

The refrigerant vapor flows upwardly through the tubes or risers 16 into vessel 18 which serves as a vapor separator. Due to baffling in vessel 18, refrigerant vapor is separated from raised absorption solution and flows through conduit 23 into a vapor separator 25 and thence through conduit 26 into condenser 11. Liquid formed in separator 25 returns to vessel 18 through conduit 28. The liquid refrigerant formed in condenser 11 by condensation of the water vapor flows through a U-tube 29 into a flash chamber 30 and from the latter through a conduit 31 into evaporator 12.

The evaporator 12 includes a plurality of horizontal banks of tubes 33 disposed one above the other and to which are secured heat transfer fins 34 to provide a relatively extensive heat transfer surface. Liquid refrigerant flowing to evaporator 12 is divided in any suitable manner for flow through the uppermost banks of tubes 33. The dividing of liquid may be effected by providing a liquid distributing trough 35 into which the liquid flows through the conduit 31. Liquid refrigerant passes through successively lower banks of tubes through suitable end connections which are open to permit escape of vaporized refrigerant from the tubes, and any excess liquid is discharged from the lowermost banks of tubes 33 into a conduit 59, as will be described presently.

Liquid refrigerant supplied to tubes 33 evaporates therein to produce a refrigerating or cooling effect with consequent absorption of heat from the surroundings, as from a stream of air flowing over the exterior surfaces of the tubes 33 and fins 34. The vapor formed in tubes 33 passes out into end headers 36 which are connected by conduits 36' to the ends of a manifold 37 which is connected at one end to the top part of absorber 14. The flash chamber 30 is provided to take care of any vapor flashing of liquid being fed to evaporator 12 through U-tube 29. The flashed vapor formed in the initial cooling of the liquid flowing to chamber 30 from condenser 11 passes through a conduit 37' into the manifold 37 and mixes with vapor formed in the evaporator 12, so that disturbances in the evaporator due to vapor flashing are avoided.

In absorber 14 refrigerant vapor is absorbed into absorption liquid which enters through a conduit 39 and tube 40. The upper end of conduit 39 is also connected by a tube 41 to the manifold 37 for venting the upper part of conduit 39. The absorption liquid entering absorber 14 flows into an annular trough 43 from which liquid siphons onto the uppermost or top turns of two concentric coils 44 and 44'. Liquid drips from each turn of coils 44 and 44' onto succeeding lower turns, whereby all of the turns of the coils are wetted with a film of liquid.

The refrigerant vapor formed in evaporator 12 passes through the headers 36' and manifold 37 into the absorber 14 where it is absorbed by the absorption solution, and, due to such absorption of refrigerant, the absorption solution becomes enriched in refrigerant. The enriched absorption solution flows from absorber 14 through a conduit 47, a first passage in liquid heat exchanger 48, conduit 49, vessel 50 and conduit 51 into the lower space 17 of generator 10. Refrigerant vapor is expelled out of solution in generator 10 by heating and the solution is raised by gas or vapor-lift action in riser tubes 16, as explained above.

The absorption solution in vessel 18 is weak in refrigerant since refrigerant vapor has been expelled therefrom in generator 10. This absorption liquid, which has been deprived of refrigerant, flows through a conduit 52, a second passage in liquid heat exchanger 48, and conduit 39 into the upper part of absorber 14. This circulation of absorption solution results from the raising of liquid by vapor-lift action in vertical riser tubes 16, whereby the liquid can flow to absorber 14 and return from the latter to the generator 10 by force of gravity. The upper part of vessel 50 is connected by a conduit 53 to vessel 18, so that the pressure in vessel 50 is equalized with the pressure in the upper part of generator 10 and condenser 11.

The heat liberated with absorption of refrigerant vapor in absorber 14 is transferred to a cooling medium, such as water, for example, which flows upward through the vertically disposed coils 44 and 44'. The cooling medium enters the lower ends of the coils through a conduit 54 and leaves the upper ends of the coils 44 and 44' through a conduit 55. The conduit 55 is connected to condenser 11, whereby the same cooling medium may be utilized to cool condenser 11 and absorber 14. The cooling medium passes from condenser 11 through a conduit 56.

The system described above operates at a low pressure with the generator 10 and condenser 11 operating at one pressure and the evaporator 12 and absorber 14 operating at a lower pressure, the pressure differential therebetween being maintained by liquid columns. Thus, the liquid column formed in U-tube 29 maintains the pressure differential between condenser 11 and evaporator 12, the liquid column in conduit 47 maintains the pressure differential between the outlet of absorber 14 and generator 10, and the liquid formed in conduit 39 and connected parts including conduit 52 maintains the pressure differential between the inlet of the absorber and the upper part of generator 10. In operation, the liquid columns may form in conduits 47, 52 and downleg of tube 29 to the levels $x$, $y$ and $z$, for example. The conduits are of such size that restriction to gas flow is effected without appreciably restricting flow of liquid.

The liquid column formed in vessel 50 and conduit 51 provides the liquid reaction head for raising liquid in riser tubes 16 by vapor-lift action. The vessel 50 is of sufficient volume to hold the liquid differential in the system and is of such cross-sectional area that the liquid level therein does not appreciably vary, so that a substantially constant reaction head is provided for lifting liquid in generator 10.

In accordance with my invention, in order to eliminate condensate knocking and superheating, means including heat operated devices are provided to introduce vapor into the generator 10 at the region where boiling of the circulating absorption solution is impending. In the embodiment in Fig. 1 the means comprises a conduit 59 for conducting unevaporated refrigerant from evaporator 12 to a space or compartment 60 formed in the bottom of generator 10 below the space 17 into which absorption solution flows from absorber 14. The heat operated devices comprise relatively short vertical tubes 61 extending into compartment 60 at their lower ends and projecting upwardly therefrom through space 17 into the riser tubes 16, as shown most clearly in Fig. 2.

In the embodiment illustrated in Fig. 3, a conduit 63 having a portion thereof provided with cooling fins 64 is connected at its upper end to the liquid-vapor separator 25 and its lower end to space or compartment 60. In the embodiment shown in Fig. 4 a conduit tube 66 also provided with cooling fins 67 is connected at its upper end to vessel 18 at the top of generator 10 and at its lower end to the space or compartment 60.

In the embodiments illustrated in Figs. 3 and 4, the conduit 59 in Fig. 1 may be connected to the upper part of vessel 50 whereby unevaporated refrigerant is returned to the absorption liquid circuit to mix with solution on its way to generator 10. As shown in Fig. 3, the conduit 59 includes a U-shape portion so that a liquid column may form therein to maintain the pressure differential between evaporator 12 and vessel 50.

In all embodiments of the invention described above, liquid rising in the space or chamber 60 and tubes 61 is rapidly vaporized by the hot solution because this liquid contains less absorption solution and is richer in the lower boiling refrigerant (in this case water) than the liquid in the riser tubes. Hence, this liquid vaporizes more readily than the absorption solution in the riser tubes 16 and introduced as vapor in the latter at the regions where vaporization of the absorption solution is impending. As this vapor rises into the solution in the generator, which is at or slightly above the equilibrium temperature, ebullition of the solution takes place. The turbulence thus produced reduces the temperature gradient toward the central core and increases the rate of heat transfer between the generator tube walls and the solution. The entire body of liquid in the tubes is thus heated more uniformly, thereby substantially eliminating local superheating and condensate knocking.

While certain embodiments of the invention have been shown and described for purposes of illustration, it will be evident to those skilled in the art that various modifications and adaptations may be made therein without departing from the scope and spirit of the invention as set forth in the following claims.

What is claimed is:

1. An absorption refrigeration apparatus comprising a vertically extending vapor expeller comprising a riser tube, a connection for introducing absorption solution enriched in refrigerant into the lower end of said tube, a connection for withdrawing solution deprived of refrigerant from the upper end of said tube, and a device extending a substantial distance into said tube and operated by the heat of absorption solution therein for introducing vapor into said tube at the region where boiling is impending so as to promote ebullition of the absorption solution therein and effect substantially uniform heating of said solution.

2. An absorption refrigeration apparatus comprising a vertically extending vapor expeller comprising a riser tube, a connection for introducing absorption solution enriched in refrigerant into the lower end of said tube, a connection for withdrawing solution deprived of refrigerant from the upper end of said tube, and means for introducing a liquid richer in refrigerant and containing less absorption solution than said enriched absorption solution into heat exchange relationship with the solution in said tube to cause vaporization and for introducing the vapor thus formed into the solution in said tube so as to promote ebullition and to effect substantially uniform heating of said solution.

3. An absorption refrigeration apparatus of the type which operates in a partial vacuum comprising a vertically extending generator comprising a riser tube, a jacket cooperating with said riser tube to form a circumferential chamber therebetween extending throughout substantially the entire length of the tube, a connection for introducing absorption liquid into the lower end of said riser tube, apparatus for introducing steam at atmospheric pressure into said chamber to effect substantially full length heating of said tube at constant temperature and to thereby cause lifting of liquid by vapor-lift action with the expelled vapor forming a central core within an upwardly rising annulus of liquid, and means including a heat operated device for introducing vapor into said riser tube to promote ebullition of the liquid therein and to increase the rate of heat transfer between said tubes and said liquid.

4. An absorption refrigeration apparatus comprising a vertically extending generator comprising a riser tube, a jacket about said riser tube forming a chamber, a connection for introducing absorption liquid into the lower end of said riser tube, a connection for introducing a heating medium to said chamber to effect substantially full length heating of said tube and thereby to cause lifting of liquid by vapor-lift action with the expelled vapor forming a central core within an upwardly rising annulus of liquid, a relatively short ebullator tube extending through said riser tube from the bottom thereof to a region where boiling is impending in said absorption liquid, and a connection for introducing a readily vaporizable liquid into the bottom of said ebullator tube to be vaporized therein to form a vapor which is introduced into the absorption liquid in said riser tube to promote ebullition therein and thereby to increase the rate of heat transfer between said riser tube and said absorption liquid.

5. An absorption refrigeration apparatus comprising a vertically extending generator comprising a riser tube, a jacket about said riser tube forming a chamber, a connection for introducing absorption liquid into the lower end of said riser tube, a connection for introducing a heating medium to said chamber to effect substantially full length heating of said tube and thereby to cause lifting of liquid by vapor-lift action with the expelled vapor forming a central core within an upwardly rising annulus of liquid, a relatively short ebullator tube extending through said riser tube from the bottom thereof to a region where boiling is impending in said absorption liquid, an ebullator compartment at the bottom of said generator communicating with said ebullator tube, and a connection for introducing a readily vaporizable liquid into said compartment for vaporization in said ebullator tube to form a vapor which is introduced into the absorption liquid in said riser tube to promote ebullition therein and thereby to increase the rate of heat transfer between said riser tube and said absorption liquid.

6. An absorption refrigeration system comprising a vapor expeller, a condenser, an evaporator, an absorber below the top of the vapor expeller and connections between the aforementioned parts to provide a circuit for circulating refrigerant and absorption solution, the vapor expeller comprising a chamber, a plurality of riser tubes having their lower ends communicating with the chamber to receive absorption solution flowing from the absorber, and means for heating the riser tubes of the vapor expeller to cause liquid therein to be lifted to a level above the absorber by vapor-lift action with the expelled vapor forming a central core within an upwardly rising annulus of liquid, and means cooperating with said riser tubes for vigorously ebullating the solution therein at the region where boiling is impending to effect substantially uniform heat of said solution.

7. An absorption refrigeration system comprising a vapor expeller, a condenser, an evaporator, an absorber and connections between the aforementioned parts to provide a circuit for circulating refrigerant and absorption solution, the vapor expeller comprising a chamber, a plurality of riser tubes having their lower ends communicating with the chamber to receive absorption solution flowing from the absorber and adapted to be heated to cause lifting of liquid by vapor-lift action with the expelled vapor forming a central core within an upwardly rising annulus of liquid, and means including a device in each tube operated by the heat of the absorption solution therein for introducing vapor into said riser tube to promote ebullition of the liquid therein and thereby to increase the rate of heat transfer between said tube and said liquid.

8. An absorption refrigeration system comprising a vapor expeller, a condenser, an evaporator, an absorber and connections between the aforementioned parts to provide a circuit for circulating refrigerant and absorption solution, the vapor expeller comprising a riser tube, a jacket about said riser tube forming a chamber, a connection for introducing absorption liquid into the lower end of said riser tube, a connection for introducing a heating medium to said chamber to effect substantially full length heating of said tube and thereby to cause lifting of liquid by vapor-lift action with the expelled vapor forming a central core within an upwardly rising annulus of liquid, a relatively short ebullator tube extending through said riser tube from the bottom thereof to a region where boiling is impending in said absorption liquid, and a connection for conducting a readily vaporizable liquid rich in refrigerant from a point in said system outside said vapor expeller and introducing same into the bottom of said ebullator tube for vaporization therein to form a vapor which is introduced into the absorption liquid in said riser tube to promote ebullition therein and thereby to increase the rate of heat transfer between said riser tube and said absorption liquid.

9. An absorption refrigeration system comprising a vapor expeller, a condenser, an evaporator, an absorber and connections between the aforementioned parts to provide a circuit for circulating refrigerant and absorption solution, the vapor expeller comprising a riser tube, a jacket about said riser tube forming a chamber, a connection for introducing absorption liquid into the lower end of said riser tube, a connection for introducing a heating medium to said chamber to effect substantially full length heating of said tube and thereby to cause lifting of liquid by vapor-lift action with the expelled vapor forming a central core within an upwardly rising annulus of liquid, a relatively short ebullator tube extending through said riser tube from the bottom thereof to a region where boiling is impending in said absorption liquid, and a connection connecting said ebullator tube to said evaporator for conducting unvaporized refrigerant liquid from said evaporator into said ebullator tube for vaporization therein to form a vapor which is introduced into the absorption liquid in said riser tube to promote ebullition therein and thereby to increase the rate of heat transfer between said riser tube and said absorption liquid.

10. An absorption refrigeration system comprising a vapor expeller, a condenser, an evaporator, an absorber and connections between the aforementioned parts to provide a circuit for circulating refrigerant and absorption solution, the vapor expeller comprising a riser tube, a jacket about said riser tube forming a chamber, a connection for introducing absorption liquid into the lower end of said riser tube, a connection for introducing a heating medium to said chamber to effect substantially full length heating of said tube and thereby to cause lifting of liquid by vapor-lift action with the expelled vapor forming a central core within an upwardly rising annulus of liquid, a relatively short ebullator tube extending through said riser tube from the bottom thereof to a region where boiling is impending in said absorption liquid, a conduit connecting said ebullator tube to the inlet of said condenser for conducting vapor therefrom, and a device for condensing the vapor in said conduit and for introducing the condensate into said ebullator tube for vaporization therein to form a vapor which is introduced into the absorption liquid in said riser tube to promote ebullition therein and thereby to increase the rate of heat transfer between said riser tube and said absorption liquid.

11. An absorption refrigeration system comprising a vapor expeller, a condenser, an evaporator, an absorber and connections between the aforementioned parts to provide a circuit for circulating refrigerant and absorption solution, the vapor expeller comprising a riser tube, a jacket about said riser tube forming a chamber, a connection for introducing absorption liquid into the lower end of said riser tube, a connection for introducing a heating medium to said chamber to effect substantially full length heating of said tube and thereby to cause lifting of liquid by vapor-lift action with the expelled vapor forming a central core within an upwardly rising annulus of liquid, a relatively short ebullator tube extending through said riser tube from the bottom thereof to a region where boiling is impending in said absorption liquid, a conduit connecting said ebullator tube to the top of said vapor expeller for conducting vapor therefrom, and a device for condensing the vapor in said conduit and for introducing the condensate into said ebullator tube for vaporization therein to form a vapor which is introduced into the absorption liquid in said riser tube to promote ebullition therein and thereby to increase the rate of heat transfer between said riser tube and said absorption liquid.

12. An absorption refrigeration apparatus comprising a vapor expeller, a connection for introducing absorption solution enriched in refrigerant into the vapor expeller, structure for applying heat to said vapor expeller to expel refrigerant vapor from the absorption solution, a connection for withdrawing solution deprived of refrigerant from said vapor expeller, and means for introducing fluid richer in refrigerant than said enriched absorption solution into the vapor expeller to promote ebullition at the place where heat is applied whereby to prevent superheating and reduce condensate knocking.

13. An absorption refrigeration apparatus of the type which operates in a partial vacuum comprising a circuit for absorption solution including a vapor expeller, a connection for introducing absorption solution enriched in refrigerant into the vapor expeller, structure for applying heat to said vapor expeller to expel refrigerant vapor from the absorption solution, a connection for withdrawing solution deprived of refrigerant from the vapor expeller, and means for introducing a fluid into the vapor expeller from a source outside said absorption solution circuit to promote boiling of the absorption solution whereby to prevent superheating and reduce condensate knocking.

FRANKLIN A. GROSSMAN.